US012594685B2

(12) United States Patent
Reinfeld et al.

(10) Patent No.: US 12,594,685 B2
(45) Date of Patent: Apr. 7, 2026

(54) DEVICE AND METHOD FOR MACHINING THE EDGES OF CASTING STRANDS

(71) Applicant: SMS group GmbH, Düsseldorf (DE)

(72) Inventors: Florian Reinfeld, Wesel (DE); Dirk Thevißen, Hergenrath (BE); Thomas Leisten, Hückelhoven (DE)

(73) Assignee: SMS group GmbH, Düsseldorf (DE)

( * ) Notice: Subject to any disclaimer, the term of this patent is extended or adjusted under 35 U.S.C. 154(b) by 157 days.

(21) Appl. No.: 18/682,895

(22) PCT Filed: Sep. 16, 2022

(86) PCT No.: PCT/EP2022/075838

§ 371 (c)(1),
(2) Date: Feb. 10, 2024

(87) PCT Pub. No.: WO2023/041740

PCT Pub. Date: Mar. 23, 2023

(65) Prior Publication Data

US 2024/0367332 A1 Nov. 7, 2024

(30) Foreign Application Priority Data

Sep. 17, 2021 (DE) ..................... 10 2021 210 344.8

(51) Int. Cl.
*B26D 3/02* (2006.01)
*B22D 31/00* (2006.01)

(52) U.S. Cl.
CPC ............. *B26D 3/02* (2013.01); *B22D 31/002* (2013.01)

(58) Field of Classification Search
CPC ................................ B26D 3/02; B22D 31/002
See application file for complete search history.

(56) References Cited

U.S. PATENT DOCUMENTS

| | | | | |
|---|---|---|---|---|
| 4,610,586 A | 9/1986 | Langeder | | |
| 5,542,325 A * | 8/1996 | Bane, III | B26D 1/547 83/435.11 | |
| 5,626,181 A | 5/1997 | Lotz et al. | | |
| 5,746,102 A * | 5/1998 | Benzing, III | B26D 1/045 83/217 | |
| 2005/0092426 A1* | 5/2005 | Lammers | E04D 3/40 156/256 | |

FOREIGN PATENT DOCUMENTS

| | | | |
|---|---|---|---|
| DE | 1228123 | B | 11/1966 |
| DE | 1783057 | A1 | 3/1971 |
| DE | 3515111 | A1 | 8/1993 |
| EP | 0128375 | A1 | 12/1984 |
| JP | S6039011 | A | 2/1985 |
| JP | 2000061723 | A | 2/2000 |
| JP | 4231270 | B | 2/2009 |
| JP | 2010207570 | A | 9/2010 |
| KR | 20140021359 | | 2/2014 |

* cited by examiner

*Primary Examiner* — Omar Flores Sanchez
(74) *Attorney, Agent, or Firm* — Smartpat PLC

(57) ABSTRACT

A device for machining the edges of casting strands includes one machining tool each that can be brought into contact with a longitudinal edge of the casting strand, and at least one guide element for perpendicularly applying the machining tools to the longitudinal edges. Means are provided for moving the machining tools in parallel to the longitudinal edges of the casting strands, in order to modify the relative speed between the longitudinal edges and the machining tools.

17 Claims, 3 Drawing Sheets

DEVICE AND METHOD FOR MACHINING THE EDGES OF CASTING STRANDS

CROSS-REFERENCE TO RELATED APPLICATION

This application is a national stage application, filed under 35 U.S.C. § 371, of International Patent Application PCT/EP2022/075838, filed on Sep. 16, 2022, which claims the benefit of German Patent Application DE 10 2021 210 344.8, filed on Sep. 17, 2021.

TECHNICAL FIELD

The disclosure relates to a device for machining the edges of casting strands, comprising one machining tool each that can be brought into contact with a longitudinal edge of the casting strand, and at least one guide element for perpendicularly applying the machining tools to the longitudinal edges. The disclosure also relates to a system comprising a casting strand, preferably a continuously cast casting strand, and such a device. Finally, the disclosure also relates to a method for machining the edges of casting strands by means of a device provided for this purpose.

BACKGROUND

Previous edge planers for processing the longitudinal edges of cast hot ingots process the longitudinal edges of the casting strand for chamfering at a cutting speed that cannot be influenced, but is dependent on the casting speed of the casting strand. The adjustment of the chisels is usually effected in relation to the longitudinal edges using two linear, pneumatically pretensioned carriages. Such a device according to the prior art is shown below in FIG. 1.

A disadvantage of such devices according to the prior art is that the cutting speed of the chisels is limited and predetermined by the casting speed of the casting strand. This results in flowing chips, which lead to quality problems. Such flowing chips may potentially enter the downstream rolling mill and lead to quality problems in the finished product. Furthermore, problems often occur with linear and pneumatically pretensioned guide elements, as follows. The guide elements have the task of compensating for the transverse movements of the ingot and thus keeping the cutting depth constant. Due to soiling and also so-called “drawer effects,” the solution according to the prior art is subject to errors.

The previous edge planer had no way of influencing the cutting speed of the continuously cast casting strand and is thus dependent on the casting speed. However, the casting speed is not sufficient to achieve the required cutting speed, which is highly necessary for a chip. This produces flowing chips, which lead to quality problems in the downstream rolling process and cause inadequate quality of the end product. The resulting flowing chips cannot be easily discharged into a collection container and prevent operation without any disruption. The flowing chips make it necessary to intervene manually in the process from time to time. The adjustment of the machining tools, preferably the four chisels, are effected via two linear, pneumatically pretensioned carriages. There is preferably one carriage on the drive side and one on the operator side of the casting strand, each with two chisels to chamfer all four edges. The casting strand can have a lateral deflection due to the process, which is to be compensated for by the linear guided adjustment. However, the foundry environment (for example, heat, dirt and water) can lead to the guide element no longer functioning without any disruption within a very short time. Thus, the lateral casting strand movement can no longer be adequately compensated for and leads to different cutting depths, which are reflected in the end product.

SUMMARY

The present disclosure provides an improved device and a method for chip removal at the four longitudinal edges of a continuously cast casting strand. This is achieved by a device, a system and a method as disclosed herein.

The device for machining the edges of casting strands has one machining tool each that can be brought into contact with a longitudinal edge of the casting strand, and at least one guide element for perpendicularly applying the machining tools to the longitudinal edges of the casting strand. Means are provided for moving the machining tools in parallel to the longitudinal edges of the casting strands in order to modify the relative speed between the longitudinal edges and the machining tools. The machining tools are thus set in motion relative to the casting strand speed, in order to ensure that the processing of the longitudinal edges of the casting strand is not exclusively dependent on the casting speed of the casting strand. This ensures that flowing chips can be reliably avoided and that the machining process can be carried out without any disruption and, in particular, without damaging the finished product.

Preferably, the casting strand is a slab or a sheet, in particular a continuously cast casting strand.

In a further preferred embodiment, the machining tool is a chisel, preferably an edge planer.

It is preferable if the perpendicular guide element for the machining tools in relation to the longitudinal edges of the casting strand comprises a carriage, preferably with means for pneumatic or hydrostatic application of force to the machining tools.

It is also preferable if the carriage is connected to rolls that can be brought into contact with at least one surface, preferably two opposing surfaces, of the casting strand in order to enable lateral tracking of the carriage in relation to changes in the position of the casting strand within the device. Moreover, it is particularly preferable if the carriage is mounted in a horizontal sliding manner on at least one vertically arranged column, preferably two vertically arranged columns. The lateral deflection of the casting strand is securely compensated for by this arrangement of the carriage within the device. Setting is preferably carried out via a pneumatic cylinder with a corresponding parameter setting. The cutting depth settings can preferably be set relative to the carriage. The roll guide element ensures that a constant cutting depth is maintained.

In a particularly preferred embodiment, an oscillating movement of the tool relative to the longitudinal edge can be effected by the means for parallel movement. It is exceedingly preferred if the means for parallel movement comprises an eccentric drive, preferably an eccentric motor, via which an oscillating movement of the cutting tool, preferably each cutting tool, can be effected relative to the longitudinal edge of the casting strand. The motorized eccentric drive causes the rotational movement of the cam to result in a translational movement of the machining tool in relation to the longitudinal edge of the casting strand. This causes a periodic relative movement of each tool in relation to the longitudinal edge of the casting strand by particularly simple and easily controllable means, wherein, in a particularly preferred embodiment, the rotational speed and/or the eccentricity of the eccentric drive can be variably set. With such an eccentric drive, the relative speed of the machining tool is modified regularly and periodically in relation to the longitudinal edge of the casting strand to be machined, as a result of which reliable chip breaking is ensured.

Oscillation and the associated change in direction of the machining tools result in targeted chip breaking and thus a defined chip parameter. This allows the chips to be discharged into the chip collection tray without any disruption, thus minimizing the risk of rolled-in chips in the downstream rolling mill. The cutting depth is preferably optimized by an adapted guide element, as a result of which a higher casting strand quality and ultimately a higher quality of the final product to be produced arise. Additional manual intervention by the operating personnel is avoided.

In a further preferred embodiment, the cutting speed is readjusted via feedback of the casting speed to a control module, as a result of which optimum chipping conditions can be ensured at all times.

In another particularly preferred embodiment, the wear of the tools, in particular the chisels, can be evaluated via parameters of the motor drive, preferably the eccentric drive. Thereby, it is highly preferable if parameter limit values that are exceeded are evaluated by software designed for this purpose, wherein such software preferably signals that the limit values have been exceeded after the evaluation, thus avoiding an unplanned standstill of the machine altogether. Through condition monitoring carried out in this way, greater availability of the device is ensured.

DETAILED DESCRIPTION

Figure 1:
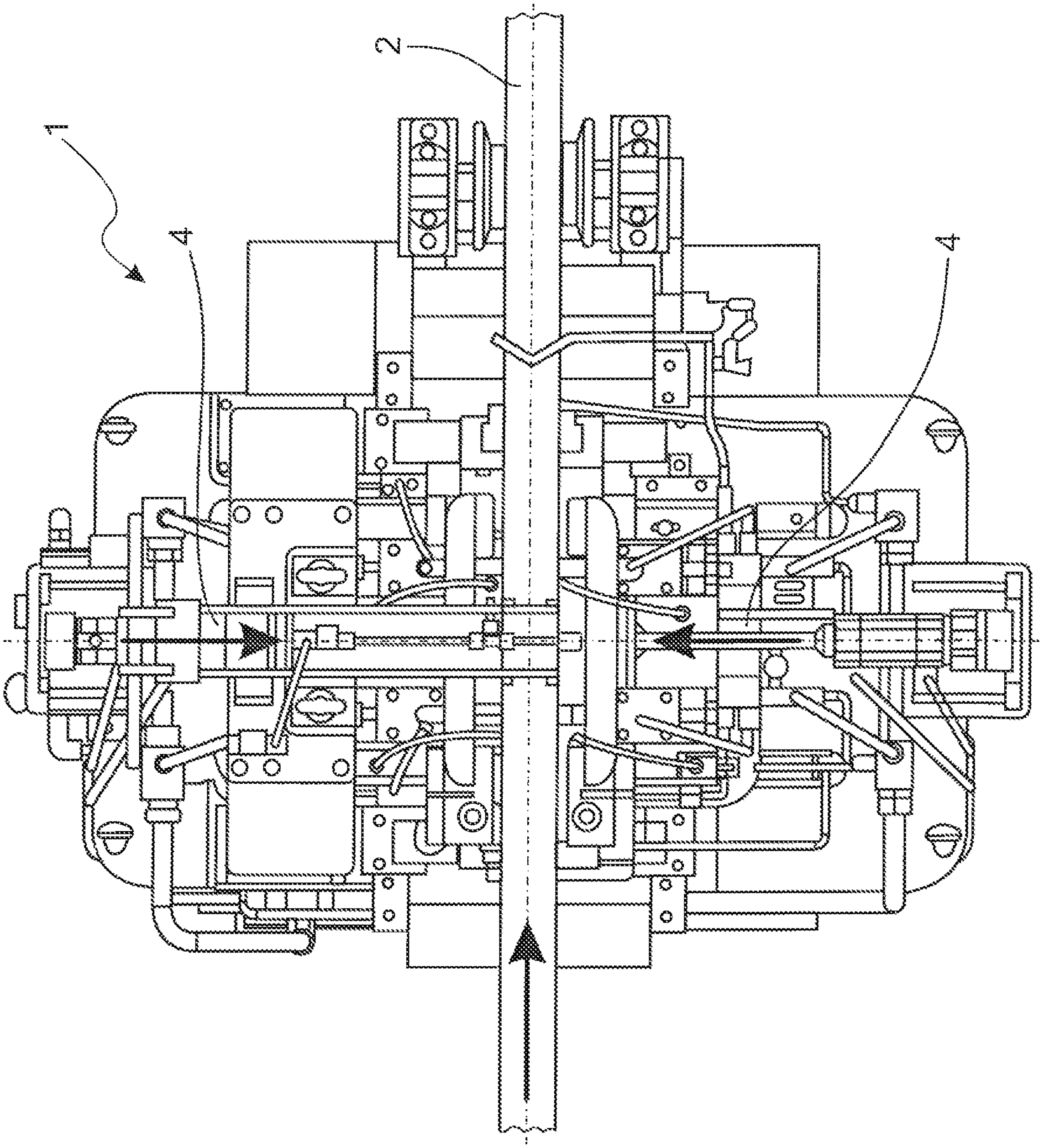
FIG. 1 shows a sectional side view of an edge planer for a continuously cast strand according to the prior art.

FIG. 1 shows a sectional side view of a device 1 for machining the edges of casting strands 2 according to the prior art. The casting strand 2 is fed through the device 1 from left to right at casting speed and thereby passes four edge planers (not shown), which are fed to the longitudinal edges of the casting strand 2 by means of linear adjustments 4. A means for modifying the relative speed between the edge planers (not shown) and the longitudinal edges of the casting strand 2 is not provided; the speed of the edge processing is predetermined solely by the speed of the casting strand 2 through the device 1.

Figure 2:
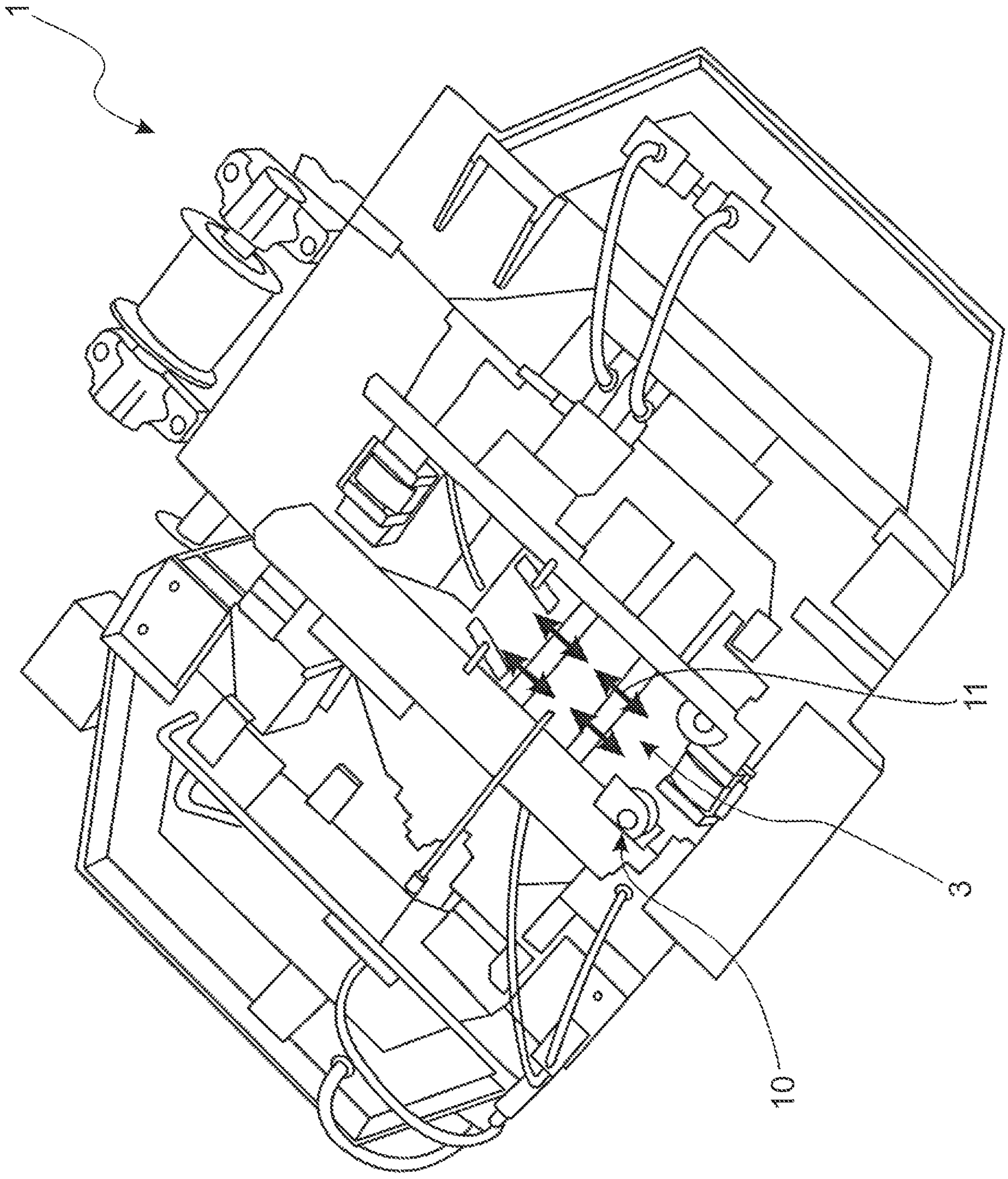
FIG. 2 shows a sectioned plan view of a device for machining the edges of casting strands.

FIG. 2 shows a top view of a device 1 for machining edges of a casting strand. In the figurative representation from the bottom left to the top right, a casting strand (not shown) runs through the device 1, thereby passing four chisels 3, which on the one hand are fed perpendicularly onto the strand (not shown) by means of a pneumatic adjustment and on the other hand perform an oscillating movement in the orientation and amplitude of the movement arrows 11 shown. This causes a regular modification in the relative speed between the chisels 3 and the longitudinal edges of the casting strand (not shown). Upon entering the device 1, the casting strand (not shown) passes rolls 10, which come into contact with the casting strand (not shown) and can therefore follow a sideways movement of the casting strand (not shown). The rolls 10 are in turn connected to the carriage 8 in such a way that a movement of each roll 10 towards or away from the casting strand (not shown) is transmitted directly to the carriage 8. This carriage 8 in turn is mounted on the strand exit side of the carriage 8 so that it can pivot about a fixed point, as a result of which it is ensured that the carriage 8 and the chisels 3 guided in it are permanently and evenly positioned on the casting strand (not shown). Finally, a vertical column guide element 6 enables the horizontal slide of the carriage 8 in the plane in which the casting strand (not shown) passes through the device 1.

Figure 3:
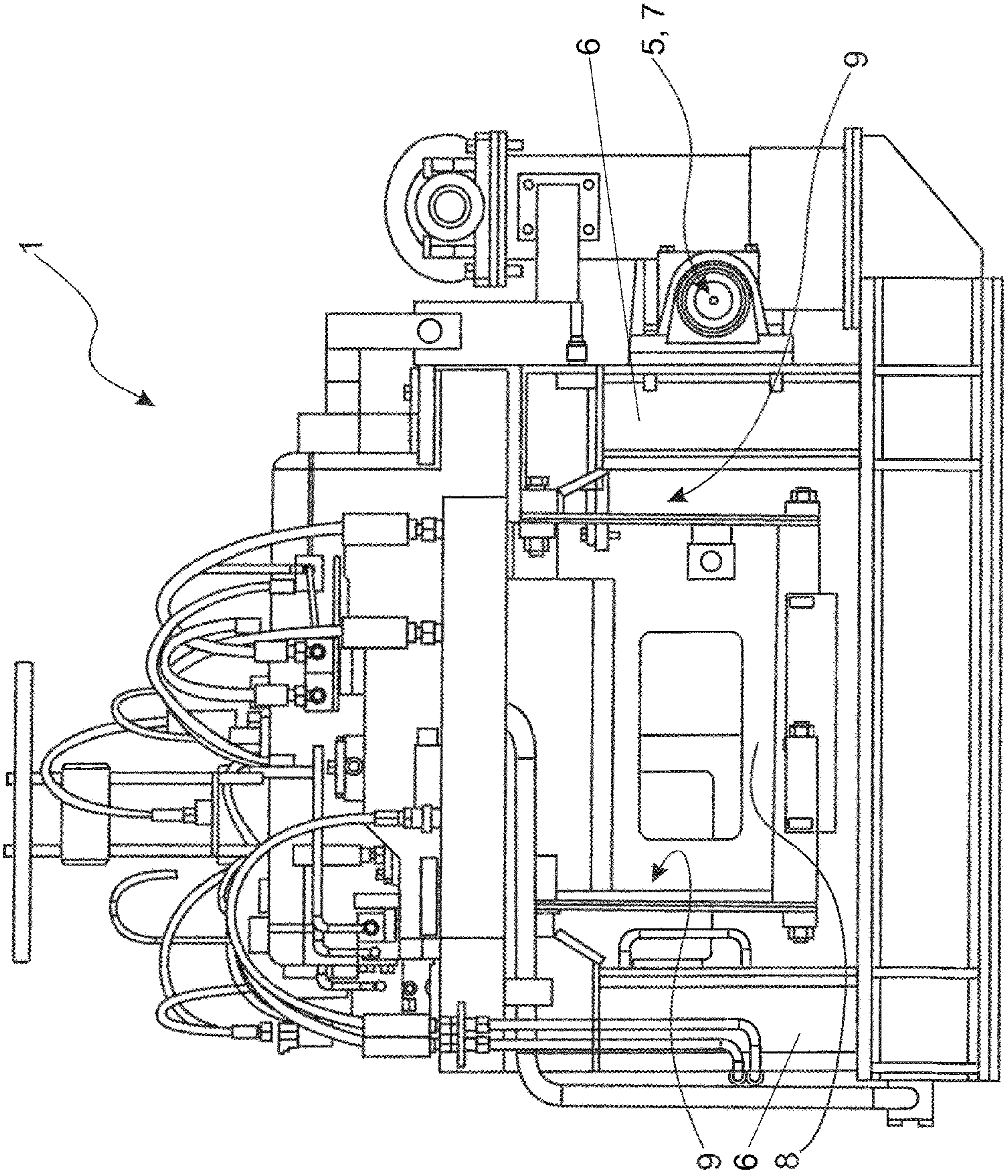
FIG. 3 shows a side view of a device for machining the edges of casting strands.

FIG. 3 shows a side view through a preferred embodiment of a device 1 for machining edges of a casting strand, in which the eccentric drive 7 is shown, by means of which a periodically acting deflection of the carriage 8 relative to the direction of movement of the casting strand (not shown) is effected by the device 1. The eccentric drive 7 transmits an oscillation dependent on its rotational speed and an oscillation amplitude dependent on its eccentricity to the carriage 8, which performs an oscillating movement to the left and right in the figure. The carriage 8 in turn is mounted between two leaf springs 9, by means of which the oscillating movement transmitted from the eccentric drive 7 to the carriage 8 is damped and cushioned in the desired manner.

LIST OF REFERENCE SIGNS

1 Device
2 Casting strands
3 Tools
4 Perpendicular guide element
5 Means for parallel movement
6 Vertical column
7 Eccentric drive
8 Leaf spring-guided carriage
9 Spring/leaf spring
10 Roll guide element
11 Movement arrows

The invention claimed is:

1. A device (1) for machining edges of a casting strand (2), comprising:
machining tools (3) that can be brought into contact with longitudinal edges of the casting strand (2); and
a guide element (4) for perpendicularly applying the machining tools (3) to the longitudinal edges; and
means (5) for moving the machining tools (3) parallel to the longitudinal edges of the casting strand (2) configured to modify a relative speed between the longitudinal edges and the machining tools (3).

2. The device (1) according to claim 1,
wherein the casting strand (2) is a slab, a sheet, or a continuously cast casting strand.

3. The device (1) according to claim 1,
wherein the tools (3) comprise a chisel.

4. The device (1) according to claim 1,
wherein the tools (3) comprise an edge planer.

5. The device (1) according to claim 1,
wherein the guide element (4) is a carriage with means for pneumatic or hydrostatic application of force to the machining tools (3).

6. The device (1) according to claim 5,
wherein the carriage is connected to rolls that can be brought into contact with two opposing surfaces of the casting strand (2) for lateral tracking of the carriage in relation to positional changes of the casting strand (2) within the device (1).

7. The device (1) according to claim 5, wherein the carriage is mounted in a horizontal sliding manner on at least one vertically arranged column (6).

8. The device (1) according to claim 5, wherein the carriage is mounted in a horizontal sliding manner on two vertically arranged columns (6).

9. The device (1) according to claim 1, wherein an oscillating movement of the tools (3) relative to the longitudinal edges can be effected by the means (5) for moving the machining tools (3).

10. The device (1) according to claim 1, wherein the means (5) for moving the machining tools (3) comprise an eccentric drive (7) by which an oscillating movement of the machining tools (3) can be effected.

11. The device (1) according to claim 10, wherein the eccentric drive (7) is an eccentric motor.

12. The device (1) according to patent claim 10, wherein a rotational speed and/or an eccentricity of the eccentric drive (7) can be variably set.

13. The device (1) according to claim 1, wherein the means (5) for moving the machining tools (3) comprises a spring (5).

14. The device (1) according to claim 11, wherein the means (5) for moving the machining tools (3) comprises a leaf spring-guided carriage (8) between the eccentric drive and the machining tools.

15. A system, comprising:
the device (1) according to claim 14; and
the casting strand (2) having longitudinal edges, the casting strand (2) being continuously cast at a constant casting speed.

16. A method for machining edges of a casting strand (2), comprising
providing a machining tool (3) that can be brought into contact with an edge of the casting strand (2), and at least one guide element (4) for perpendicularly applying the machining tools (3) to the edges; and
moving the machining tool (3) parallel to longitudinal edges of the casting strand (2) and thereby changing a relative speed between the longitudinal edges and the machining tool (3).

17. The method according to claim 16, wherein moving the machining tool (3) is performed in an oscillating manner parallel to the longitudinal edges of the casting strand (2) by an eccentric drive.

* * * * *